Figure 1:
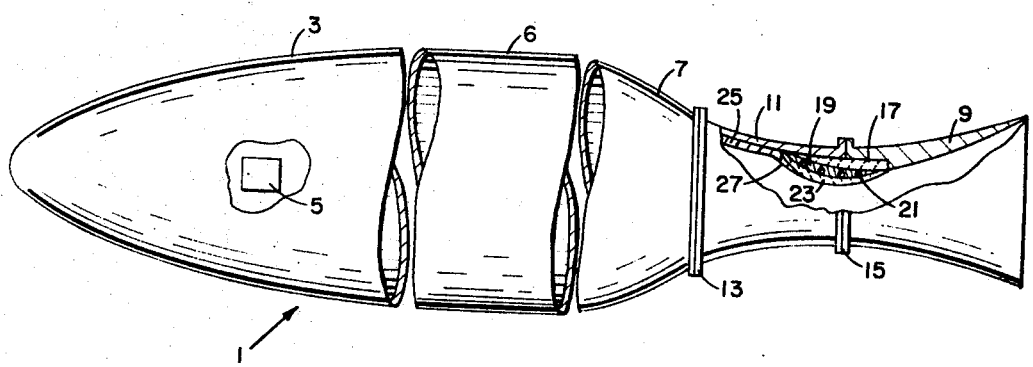

June 3, 1969  R. W. WHITE  3,447,465
MISSILE WITH VARIABLE AREA NOZZLE AND CONTROL MEANS THEREFOR
Filed Oct. 6, 1964

Richard W. White,
INVENTOR.

BY

United States Patent Office 3,447,465
Patented June 3, 1969

3,447,465
MISSILE WITH VARIABLE AREA NOZZLE AND CONTROL MEANS THEREFOR
Richard W. White, Madison, Ala., assignor to the United States of America as represented by the Secretary of the Army
Filed Oct. 6, 1964, Ser. No. 402,037
Int. Cl. F02k 1/18
U.S. Cl. 102—49.5     10 Claims The invention described herein may be manufactured and used by or for the Government for governmental purposes without the payment of any royalty thereon.

This invention relates to a missile that has a venturi shaped nozzle, the throat area of which can be quickly and accurately increased to provide the missile with a boost phase and a sustainer phase of operation.

As the range over which missiles are fired increases, the problem of accuracy in delivering a payload to a pre-selected target has become more critical. It is well known that lateral accuracy of the missile, or deviation from the target in a line perpendicular to the trajectory path, is not too great a problem for an aerodynamically stable missile. However, due to unavoidable variations in the initial velocity of rocket boosted missiles due to the rocket motor performance, the longitudinal accuracy of the missiles or deviation from the target along the trajectory path, is a problem which this invention proposes to solve.

Attempts in the past to vary the thrust and impulse during flight of solid propellant rocket motors have made use of clustering of solid propellant rocket motors. Clustering of motors gave variable thrust and impulse by varying the number of rocket motors and intervals of time at which the rocket motors were ignited. Variations in ignition time and the added hardware weight due to clustering resulted in compromising the accuracy and maximum range capability of any missile that used the clustered motor concept. Attempts have been made to vary the thrust and impulse during flight of solid propellant motors by casting two different propellants in the same motor case. Two propellants with different burning rates and surface areas loaded concentrically or end to end in a common motor case will produce a dual thrust solid propellant rocket motor. The disadvantages of this design are that the time of thrust change for continuous burning is restricted to a preset time determined by the motor design. The magnitude of the initial to final thrust rates is limited to the range in burning rates and surface areas obtainable. Present day technology allows a thrust ratio of approxiamtely 7:1. Motor processing difficulties are encountered in the manufacture of such motors, and the performance of the propellants are compromised to obtain the desired burning rates.

Accordingly, an object of this invention is to provide a solid propellant rocket motor with boost and sustainer phases of operation by providing the rocket motor with a venturi shaped nozzle, the throat area of which can be varied.

Another object of this invention is to provide a rocket motor with a variable throat area nozzle that includes an erodible throat section.

A further object of this invention is to provide a missile in which transition from one thrust level to another is not preset for one specific time, but is made upon command from the missile.

A still further object of this invention is to provide a missile in which the transition from one thrust level to another is a smooth reproducible transition.

In accordance with this invention, a new system is provided that includes a missile which has a control device mounted therein and a motor that has a venturi shaped nozzle with a variable area throat. The throat is made up of sections, one of which is removed by explosive means upon a command signal from the control device, and another throat section is made of erodible material which erodes away rapidly after the first section has been removed. Removal of the erodible section provides a smooth transition of thrust from a first boost phase of operation to a sustainer phase of operation.

Figure 2:
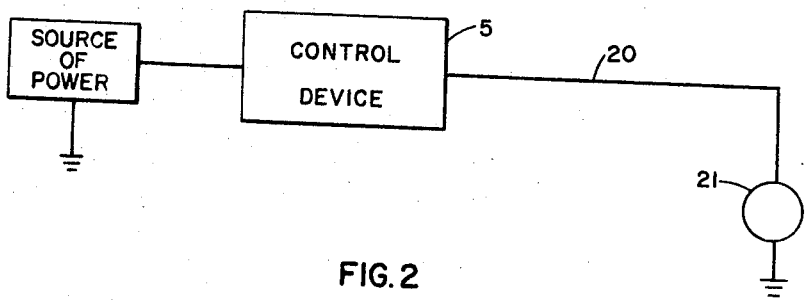

In the accompanying drawing forming a part of this specification, and in which like numerals are employed to designate corresponding parts throughout the same:

FIGURE 1 is an elevational view, partially cutaway, of a missile according to this invention, and FIGURE 2 is a schematic circuit diagram according to this invention.

This invention may be better understood by referring to the drawing wherein, numeral 1 designates a missile that includes a forward section 3 that contains a control device 5 therein, an intermediate section 6, and a rear section 7 that has the motor and nozzle structure of the missile.

The nozzle structure includes a rear nozzle section 9 and a forward nozzle section 11. Forward nozzle section 11 is secured in a conventional manner to the motor casing by forward flange means 13. Rear and forward nozzle sections 9 and 11 are secured together in a conventional manner by rear flange means 15.

The throat of the nozzle includes an outer carbon throat section 17 an intermediate erodible throat section 19 of aluminum or some other equally erodable material, explosive Primacord 21 (exaggerated as shown) mounted in or contiguous the inner periphery of erodible throat section 19, an inner carbon throat section 23, and insulation means 25 that has an end 27 that extends over a forward portion of carbon section 23.

In operation, control device 5 is set in a conventional manner to send a signal at the appropriate time by way of lead 20 (see FIGURE 2) to Primacord 21 either by being preset before launching of the missile or by receiving a command signal from a ground station. When the missile is launched, and it is desired to change from the boost thrust phase to the sustainer thrust phase of operation, control device 5 sends said signal to Primacord 21. Primacord 21 explodes and breaks up carbon section 23 allowing it to be blown out of the nozzle and expose erodible throat section 19 to the hot gases flowing from the motor chamber. Erodible throat section 19, which insures a smooth transition from boost phase to sustainer phase of operation, is quickly eroded away in a few milliseconds to outer carbon throat section 17 by the hot gases from the motor chamber. With the larger throat area of the outer carbon throat section 17, the motor will be operating in the sustainer phase or at a reduced thrust level of operation. During the transition from boost phase to sustainer phase of operation, end 27 of insulation means 25 will be blown out or made to conform to the internal shape of forward nozzle section 11.

I claim:
1. A system for transporting a payload between a preselected position and a target comprising: a missile; a motor in said missile; a nozzle secured to said motor; said nozzle having a throat section that includes an inner carbon throat section and an outer carbon throat section with explosive means therebetween; and a control device in said missile and connected to said explosive means to cause explosion thereof and removal of said inner carbon throat section from said nozzle, to thereby provide the missile with a boost phase and sustainer phase of operation.

2. A system as set forth in claim 1, wherein said explosive means includes Primacord.

3. A system as set forth in claim 1, wherein an erodible throat section is positioned between the inner and outer carbon throat sections, and said explosive means is mounted in the inner periphery of said erodible throat section.

4. A system as set forth in claim 3, wherein said explosive means is made of Primacord, and said erodible throat section is made of aluminum.

5. A venturi shaped nozzle for a rocket motor including a throat section; said throat section having concentrically arranged throat sections including an inner carbon throat section, an intermediate erodible throat section, and an outer carbon throat section; and explosive means between the inner carbon throat section and the erodible throat section for removing the inner carbon throat section.

6. A venturi shaped nozzle as set forth in claim 5, wherein each of said throat sections has an inner surface that is generally venturi in shape.

7. A venturi shaped nozzle as set forth in claim 5, wherein said explosive means is made of Primacord.

8. A venturi shaped nozzle as set forth in claim 5, wherein said erodible throat section is made of aluminum.

9. A rocket motor for a missile including a motor casing and a venturi shaped nozzle connected in serial relation, said nozzle having a throat section that includes concentrically arranged inner and outer carbon throat sections with an intermediate erodible throat section and explosive means between the inner carbon throat section and the erodible throat section for removing the inner carbon throat section at the appropriate time to change the operation of the motor from a boost phase to a sustainer phase of operation.

10. A rocket motor as set forth in claim 9, wherein each of said throat sections has an inner surface that is generally venturi in shape, said explosive means is made of Primacord, and said erodible throat section is made of aluminum.

References Cited

UNITED STATES PATENTS

| | | | |
|---|---|---|---|
| 2,952,972 | 9/1960 | Kimmel et al. | 60—35.6 |
| 3,011,309 | 12/1961 | Carter | 102—49 |
| 3,122,098 | 2/1964 | Glennan | 102—49 |

VERLIN R. PENDEGRASS, *Primary Examiner.*

U.S. Cl. X.R.

239—265.15